United States Patent [19]
Schoeck

[11] 3,859,065
[45] Jan. 7, 1975

[54] DUST COLLECTOR ELEMENT

[75] Inventor: Vincent E. Schoeck, Hagerstown, Md.

[73] Assignee: The Carborundum Company, Niagara Falls, N.Y.

[22] Filed: Jan. 3, 1972

[21] Appl. No.: 215,031

[52] U.S. Cl............................ 55/378, 55/304, 55/380
[51] Int. Cl............................................. B01d 46/06
[58] Field of Search ......................... 55/378–380, 55/341, 304; 287/60

[56] References Cited
UNITED STATES PATENTS

| | | | |
|---|---|---|---|
| 647,988 | 4/1900 | Rozansky | 287/60 |
| 1,316,883 | 9/1919 | Fatscher | 55/341 X |
| 1,328,044 | 1/1920 | Hills | 55/341 X |
| 1,765,784 | 6/1930 | Aldinger | 55/379 X |
| 2,010,898 | 8/1935 | Ruemelin | 55/341 X |
| 2,014,298 | 9/1935 | Schneible | 55/378 X |
| 2,167,236 | 7/1939 | Gieseler | 55/341 X |
| 2,732,030 | 1/1956 | Dorfan | 55/341 X |
| 2,974,748 | 3/1961 | Swanson | 55/341 X |
| 3,092,479 | 6/1963 | Hedberg | 55/379 X |
| 3,431,709 | 3/1969 | Kawanami | 55/341 X |

FOREIGN PATENTS OR APPLICATIONS

| | | | |
|---|---|---|---|
| 873,744 | 4/1902 | France | 55/380 |

Primary Examiner—Frank W. Lutter
Assistant Examiner—Vincent Gifford
Attorney, Agent, or Firm—David E. Dougherty; William H. Holt

[57] ABSTRACT

A tube type filter for dust removal from contaminated gas or air in which the filter unit comprises an outer cylindrical filter tube surrounding a smaller cylindrical inner filter tube. A special ring and cap are provided for suspending and sealing the ends of the tube and for the proper suspension and spacing of the inner tube in relation to the outer tube. These double tube filter units may be substituted for the single tubes used in conventional dust collector apparatus to give as much as an 80 percent increase in filtering capacity with no increase in tube dimensions or tube housing capacity. No changes are required in the present methods used for tube cleaning and dust removal when the double tube filter units are employed.

6 Claims, 3 Drawing Figures

PATENTED JAN 7 1975　　3,859,065

3,859,065

DUST COLLECTOR ELEMENT

BACKGROUND OF THE INVENTION

Pollution control has recently become an important factor for consideration in nearly all industrial operations and the success or failure of a manufacturing operation may well depend on the economic control of product or by-products. An especially difficult problem results when the polluting product or by-product is a particulate material or fine dust carried in a large volume of air or similar gas. This problem has existed for many years and numerous types of dust collecting apparatus have been devised in an effort to solve it. These may operate, either by washing out the dust by sprays of liquid or by passing the dusty gas through a textile filter, thereby separating the dust particles in a dry state.

The present state of the art of the devices which use textiles for the control of solid particulate matter in a gas stream allows for the use of a tubular shaped filter. The devices which commonly use woven and non-woven textiles and in which the regeneration or cleaning of the filter could be considered to be intermittent, are referred to as low ratio collectors. In this type of device, the ratio of the cubic feet of gas cleaned to the square feet of textile used for cleaning, is confined to relatively small limits. In the present state of the art, therefore, the design of pollution control devices has been fundamentally dictated by the volume of gas to be cleaned and thus the square feet of textile which had to be properly housed. This invention pertains to a method of constructing and adjoining with proper devices, a smaller filter tube geometrically relative to the interior of a larger filter tube. By changing the textile in the specific relationship of the inner and outer tube, this invention will expand the limits of the present volume to square foot relationship and still provide efficient arrest of particulate matter from a gas stream.

The invention therefore provides an outer tube similar to those used in the present state of the art, the tube enclosing an inner filter tube which is connected in annular relationship to the outer tube by means of a special ring. The invention further provides a modified connecting device which may be added to the present cell plate or floor plate inlets of existing apparatus and provides a metal closure or cap with an extension and tensioning device to close off the bottom end of the inner tube and provide for its tensioning.

Further advantages of the invention will become apparent by reference to the following drawings and detailed description pertaining to the invention.

SUMMARY OF THE INVENTION

The invention pertains to a dust collection apparatus having a cell plate separating a clean air compartment from a contaminated air compartment, said plate having openings therein and having a tube dust filter comprising: a cylindrical outer tube of textile material and a cylindrical inner tube of textile material, said inner tube disposed in annular relationship inside the outer tube; a ring having outer and inner concentric flanges around which are fitted one end of the said outer and inner tubes, respectively; a first member for supporting said ring and the attached filter tubes, having a first extension support engaging said first member; a closed circular cap having an axially extending flange, said cap being fitted to the other end of said inner tube; a sleeve secured to the said plate within each opening, the other end of the outer tube being fitted around the sleeve, and a second member attached within the outer filter tube, having an extension for engaging the closed circular cap attached to the inner tube.

DESCRIPTION OF THE INVENTION

Figure 1:
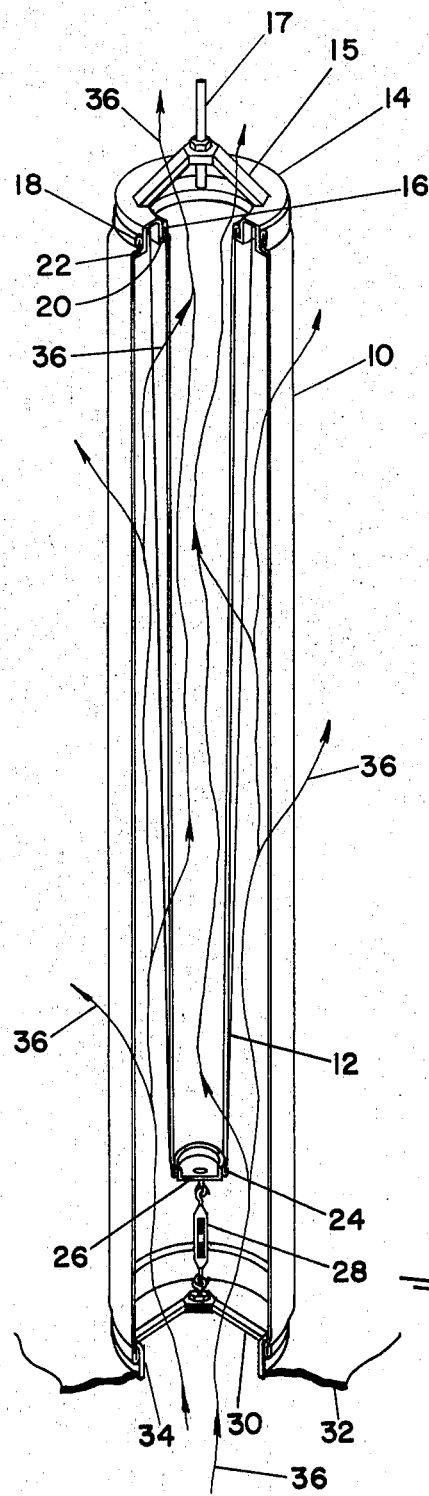
FIG. 1 shows a sectional view of the assembled inner and outer filter tubes.
Figure 2:
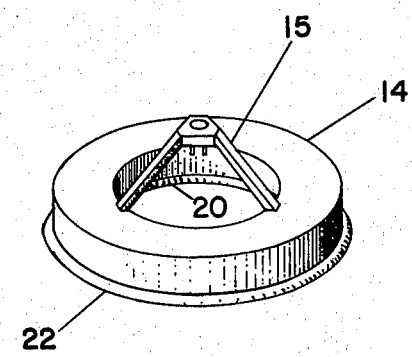
FIG. 2 shows the ring which supports one of the ends of the filter tubes.

An assembled pair of filter tubes is shown in FIG. 1. Both the outer tube 10 and the inner tube 12 are made of textile fabrics of filter grade quality. Both tubes are disposed vertically in annular relationship and are supported and sealed at one of their ends by attachment to a ring 14 (see also FIG. 2). This is suspended by a first member 15 and a first extension support 17. The first member is spider shaped, having a plurality of legs extending from it and having a connection at the junction of the legs for attaching the first extension support. The outer ends of the legs of the first member 15 are attached to the ring 14. The first extension support 17 may be a rod, as shown, or a chain or other appropriate means and the extension support may be spring loaded. This extension support is attached to a shaking device (not shown) or some other type of standard filter support mechanism depending on the type of apparatus in which the filter unit is installed.

The inner tube is provided with an expanding ring or steel band 16 at one end that will seat on a bead 20 provided on the inner side of the ring 14 to properly secure and geometrically position the inner tube in annular relationship within the outer tube. The outer tube is provided with a clamp a compression ring 18 at one end which will seat on a bead 22 provided on the outer edge of the ring to secure and position the outer tube. The other end of the inner tube is provided with a clamp or compression ring 24 to secure and position the inner tube on a special cap 26 which provides the closure for the inner tube. By means of a cap engaging extension 28 and a prism shaped second member 30, the cap 26 becomes the means of attaching the inner tube and tensioning this tube with relation to the cell plate 32 of the collector. The cell plate separates the clean air compartment from the contaminated air compartment and has a plurality of openings with suitable connectors or sleeves for filter tube attachment. The outer tube is clamped to a sleeve 34 which extends from the cell plate in a manner similar to the present state of the art.

Figure 3:
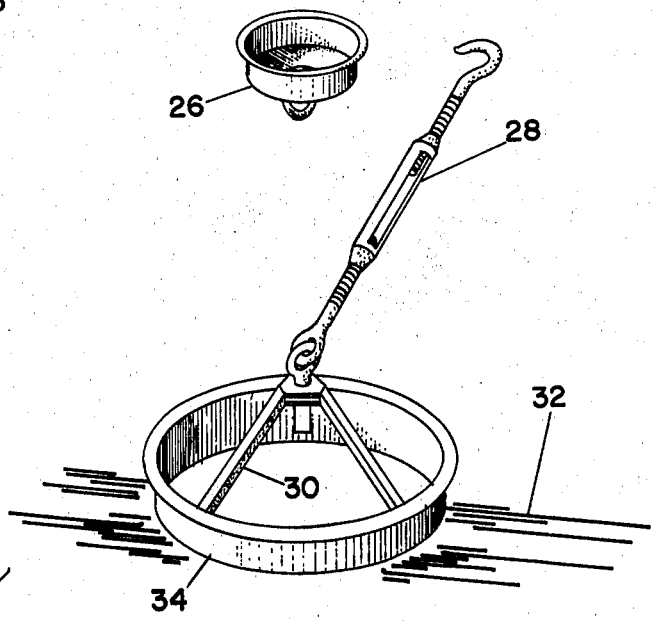
FIG. 3 shows the support sleeve for the outer filter tube with a cap engaging extension and end cap for the inner filter tube.

The inner tube cap with the second member and cap engaging extension are shown in greater detail in FIG. 3. The second member is spider shaped with a plurality of legs extending from a junction and having a connection at the junction for the cap engaging extension. The second member may be welded in place within the sleeve 34 or it may be secured by scissor locking. The cap engaging extension comprises a hook and a turnbuckle as one method of holding and tensioning the inner filter tube. Other means of tensioning, such as a spring loaded device, may also be employed.

During operation, contaminated gas enters the filter through the bottom opening and may then pass either through the outer tube 10 or through the inner tube 12. The gas flow is shown by arrows 36. Suspended particles in the gas are removed and deposited on the inner surface of tube 10 and the outer surface of tube 12.

The combination filter tube of the invention has greater capacity and versatility, compared with previous tubes, since by controlling the size relationships and geometry of the inner and outer tube to meet the conditions necessary for efficient filtration, the invention can increase the square feet of filter area available from 20 to 80 in the same allotted space as is dictated by the present state of the art. Quite possibly by expanding the limits of the volume to square foot ratios presently used in the design of filtration devices, this invention could reduce in an inverse proportion, the housing requirements for the filters.

The specific design of this invention allows for its use, not only in new devices specifically constructed for the increased limits, but also for its use in existing collectors since the relationships of the inner and outer tube are maintained by means of metallic devices that are compatible with and adaptable to present pollution control equipment. Another advantage is that the specific relationship of the inner tube to the outer tube can be varied to assist in the control of the flow characteristics of the gas stream within the filter. This control of the aerodynamic flow may further broaden the concepts of fabric filters by reducing or eliminating those factors which in the present state of the art can dictate the use or nonuse of specific textiles for specific applications. It may also be possible to control the distribution of various particle sizes within the filter tubes, thereby enhancing the degree of separation possible.

The methods of renewing or cleaning the filter fabrics in the present state of the art completely adaptable to this invention. The inner and outer tube can be cleaned simultaneously without any changes in present mechanisms. Features such as anti-collapse rings can be attached to both inner and outer tubes and will accomplish the same end results as in the present state of the art.

What is claimed is:

1. In a dust collection apparatus having a cell plate separating a clean air compartment from a contaminated air compartment, said plate having at least one opening therein, a tube type dust filter comprising:
   a. a cylindrical outer tube of textile material and a cylindrical inner tube of textile material, said inner tube disposed in annular relationship inside the outer tube;
   b. a double walled ring, said ring having an outer peripheral wall and an inner peripheral wall, the outer peripheral wall having an outwardly extending flange and the inner peripheral wall having an inwardly extending flange, means holding one end of said outer tube around the outwardly extending flange and means holding one end of said inner tube around the inwardly extending flange;
   c. a first member for supporting said ring and the attached filter tubes, and a first extension support engaging said first member;
   d. a closed cap having an outwardly extending flange, said cap being fitted to and closing the other end of said inner tube;
   e. a sleeve for being secured to said plate for surrounding said opening, the other end of said outer tube being fitted to said sleeve;
   f. a second member attached to said sleeve and tensioning means connecting said closed cap to said second member, and means for adjusting said tensioning means.

2. A dust collection apparatus according to claim 1 in which said first member is spider shaped, said first member having a plurality of legs extending therefrom and having a connection at a junction of the legs for attachment to said first extension support.

3. A dust collection apparatus according to claim 1 in which said first member is spider shaped, said first member having a plurality of legs extending outwardly from a junction, the outer ends of said legs being attached to said ring and said first extension support extending from the junction.

4. A dust collection apparatus according to claim 1 in which said second member is spider shaped, said second member having a plurality of legs extending outwardly from a junction, said extension connecting the junction of the legs to the cap.

5. A dust collection apparatus according to claim 1 in which said second member is spider shaped, said second member having a plurality of legs extending outwardly from a junction, the outer ends of said legs being attached to said sleeve and said extension extending from the junction and being connected to said cap and said junction of said second member.

6. An apparatus according to claim 1 wherein said tensioning means and said means for adjusting said tensioning means comprise a turnbuckle.

* * * * *